April 11, 1950 T. WEBER 2,503,530
FIFTH WHEEL STRUCTURE
Filed June 28, 1948 3 Sheets-Sheet 1

INVENTOR.
Tobias Weber,
BY
Attorney.

April 11, 1950     T. WEBER     2,503,530
FIFTH WHEEL STRUCTURE
Filed June 28, 1948     3 Sheets-Sheet 2
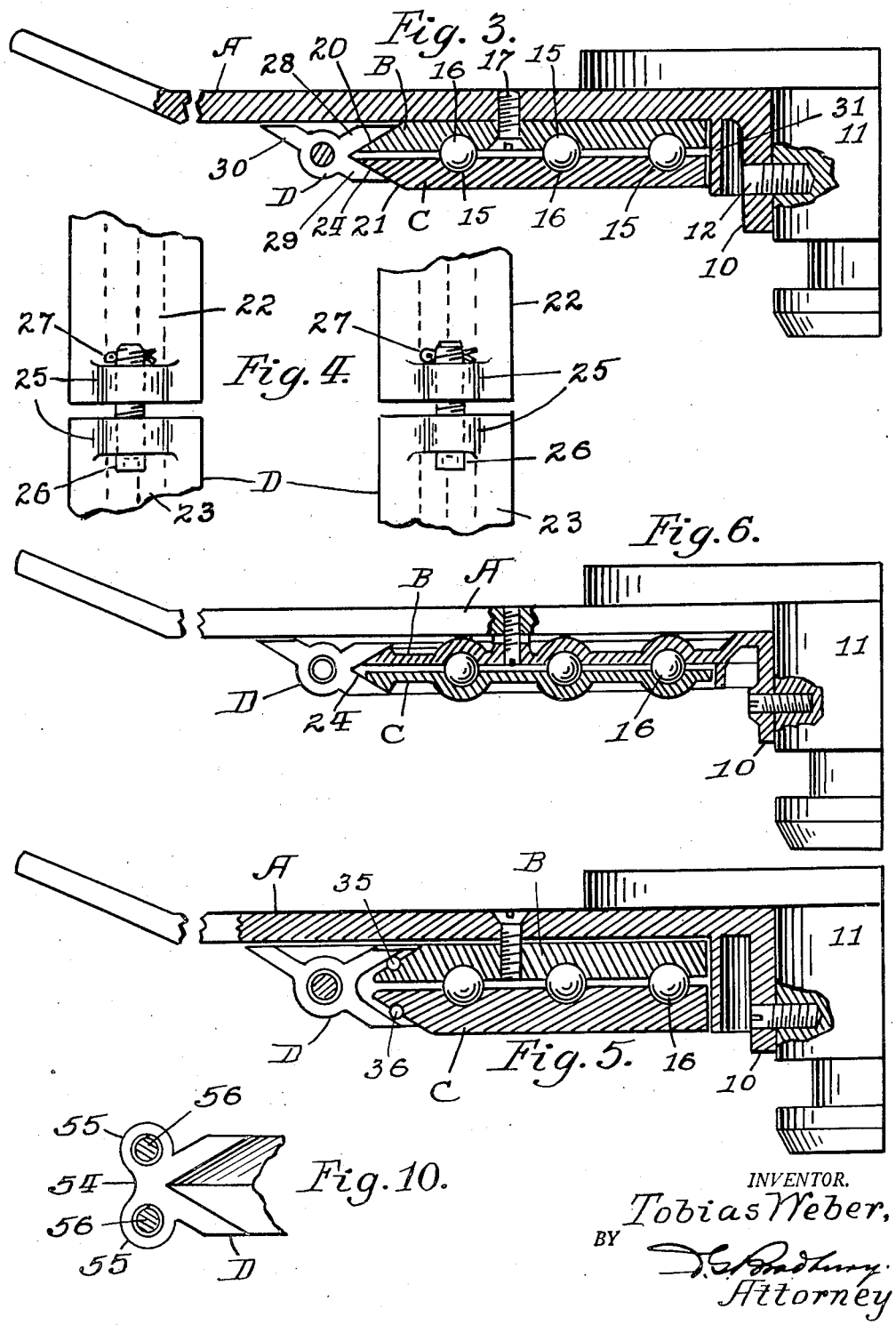

April 11, 1950     T. WEBER     2,503,530
FIFTH WHEEL STRUCTURE
Filed June 28, 1948     3 Sheets-Sheet 3
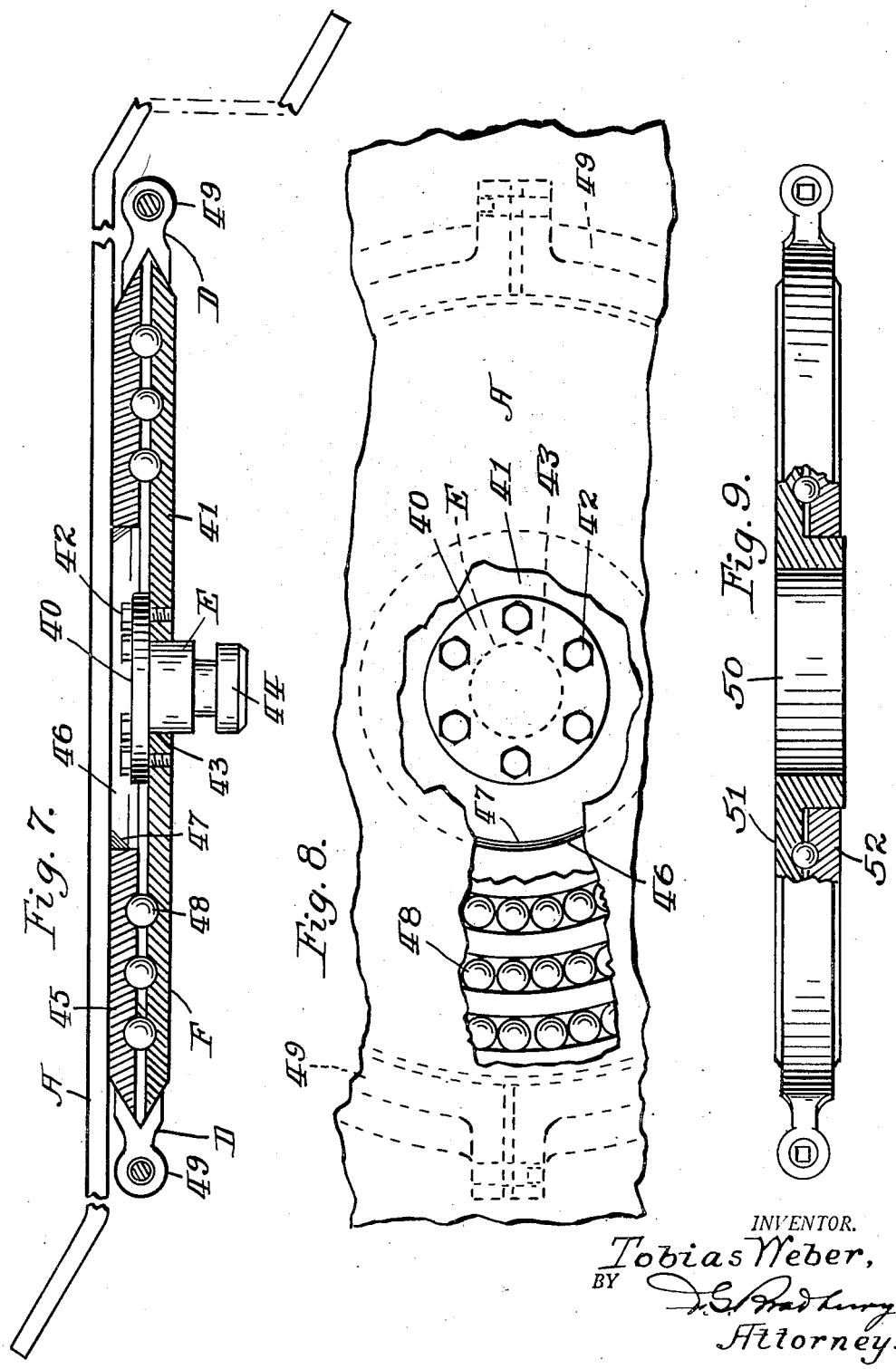
INVENTOR.
Tobias Weber,
BY
Attorney.

Patented Apr. 11, 1950

2,503,530

UNITED STATES PATENT OFFICE 2,503,530

FIFTH WHEEL STRUCTURE

Tobias Weber, Los Angeles, Calif.

Application June 28, 1948, Serial No. 35,681

8 Claims. (Cl. 308—221)

My invention relates to improvements in fifth wheel structures for use with a vehicle couple such as between the front end of a trailer and the rear end of a tractor or other propelled vehicle, the principal object being to eliminate friction and binding tendency between cooperating parts of the coupling means, and to provide readily accessible means for conveniently adjusting the working parts of the fifth wheel structure and reducing wear and binding tendency or looseness between said parts without disconnecting or separating the coupling elements.

Among the objects of my improvement is to provide readily accessible means below the antifriction fifth wheel structure when in service, whereby the fifth wheel bearing can be easily and conveniently adjusted to equalize wear and assure a smooth running connection.

More particularly this application is also directed to improvements upon the means set forth in my companion application now pending, Serial No. 682,429, filed July 9, 1946 now matured into Patent 2,468,419 issued April 26, 1949, of which this application is a continuation in part and to which reference is made.

Another object of this improvement is to provide means by which the parts thereof can be adjusted to take up any wear without using any shims. Another object is to provide a fifth wheel structure which has maximum strength of construction and which can be easily dismantled and reassembled and the parts thereof when assembled being movably interlocked and held together as a self contained unit in such manner that they are not likely to become separated unintentionally. Another object is to provide a fifth wheel coupling which enables the coupling pin thereof to be readily replaced when worn, without removing the entire antifriction bearing from the apron plate or the apron plate from the vehicle. Another object is to provide a fifth wheel antifriction bearing which itself functions as the coupling pin for the vehicle couple. Among still further objects and advantages are simplification and increased effectiveness in use.

Figure 1:
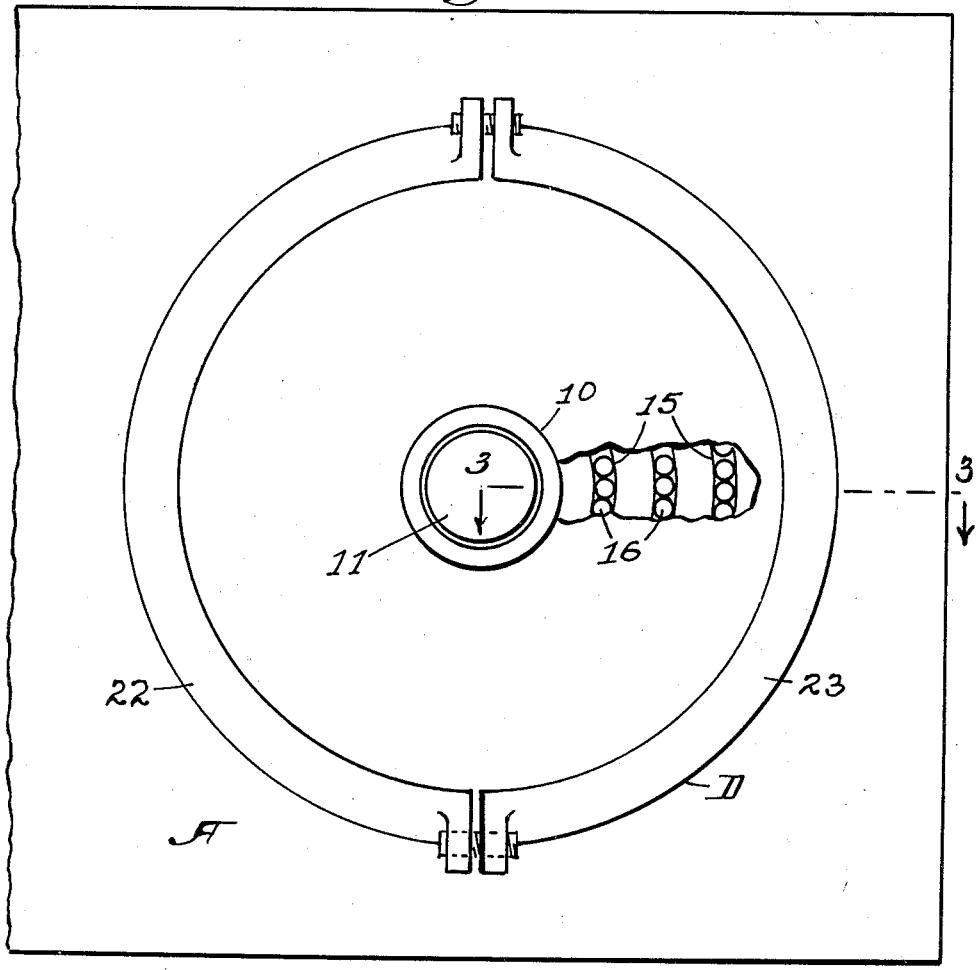
Figure 2:
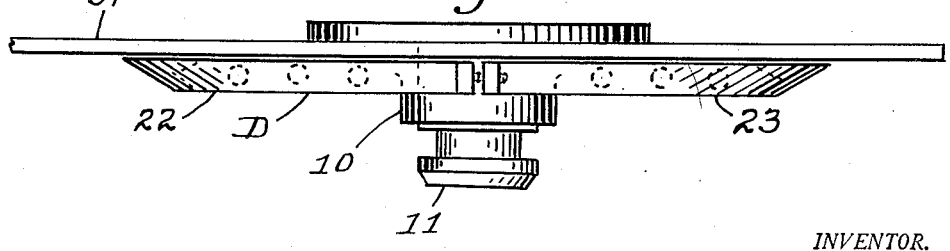

In the accompanying drawings forming part of this specification, Fig. 1 is a bottom plan of my improved fifth wheel structure which is adapted to be mounted below the bottom of the apron plate A on the front end portion of a trailer, a portion only of said apron plate being shown and a portion of the fifth wheel structure being broken away to expose the annular antifriction bearing elements which are contained between the bearing members; Fig. 2 is an elevation looking at one edge portion of the structure shown in Fig. 1; Fig. 3 is a typical cross section of a detail, at enlarged scale taken on the line 3—3 of Fig. 1; Fig. 4 is a bottom plan at enlarged scale of portions of the segmental contractible adjusting clasp; Fig. 5 is a typical cross section of one half portion of the general type of fifth wheel antifriction bearing appearing in Fig. 3, showing a modification of my improvement; Fig. 6 is another typical cross section of one half portion of the type of antifriction bearing appearing in Fig. 3, showing another alternative construction; Fig. 7 is an elevation looking at one edge portion of my improved fifth wheel coupling showing an alternative construction, the antifriction bearing portion thereof being shown in vertical central section; Fig. 8 is a plan of a detail portion of the structure shown in Fig. 7; Fig. 9 is a partial elevation and cross section looking at one edge of my improved fifth wheel antifriction bearing showing another alternative construction, and Fig. 10 is an end elevation looking at one end of one of the clasp sections showing another alternative construction.

In the drawings A represents a portion of the apron plate which is usually secured on the bottom of the forward end portion of a trailer chassis, this portion of the structure being usually employed and fastened by bolting, riveting, welding or other suitable means in conventional manner on the bottom of the forward end portion of a trailer chassis. The apron plate has the usual collar 10 depending from its lower centrally disposed portion through which the usual coupling pin 11 is inserted and projects downwardly. The coupling pin is secured rigidly in the collar 10 by the threaded bolt 12 or other suitable means with the grooved lower end thereof projecting a sufficiently exposed distance downwardly to be engaged by the companion coupling member of a motor driven vehicle by which the trailer is drawn.

B and C represent two coacting upper and lower annular fifth wheel antifriction bearing disk plates which are rotatively held together and are revoluble about a vertical axis. The inwardly facing side surfaces of these bearing plates are provided with circular pairs of concentrically arranged channels 15 in which series of bearing balls 16 are held so as to provide antifriction rotative movement between the plate members B and C. The upper bearing plate member B is rigidly secured to the lower surface of the apron plate A by welding, riveting, bolting or other suitable means, the bolt 17 being one indicative for that purpose. The lower bearing plate C functions as a bearing support on the lower companion coupling member of the tractor or other propelling vehicle in the conventional manner as shown in my companion application above identified. The antifriction bearing support thus provided is adapted to cooperate in forming a free rotative coupling connection between a pair of trailer and motor propelled vehicles.

The two bearing disk plates B and C are adjustably secured together so as to equalize and take up any loose motion and wear and to prevent objectionable tightness between their members. The adjusting means provided for this purpose is made accessible for adjusting either below the trailer and tractor connections when the latter are coupled together or when the latter are uncoupled. To accomplish this desired result the perimeters of the bearing disk plates are formed with a pair of beveled surfaces 20 and 21 which converge radially approaching an apex and clasp D is applied around said beveled surfaces and is contractible circumferentially. This clasp is composed of two segments 22 and 23 (Figs. 1 and 4), which have an inner circumferential V-shaped groove 24. The inner side surfaces of this groove correspond with and engage the opposite sides of the peripheral draw surfaces of the bearing plates and are adapted when the clasp is contracted to tighten the bearing engagement between the bearing plates or when released to loosen said engagement. The adjacent pairs of the end portions of the clasp segments are shaped with outwardly extending bosses or shoulders 25 (Figure 4), the members of each pair thereof being normally spaced apart and coupled together by adjusting socket screws 26. These screws when adjusted by the application and use of a suitable hand tool are locked and prevented from turning by cotter pins 27 or other suitable means. Sufficient slack is provided between the adjusting clasp segments and the bevels on the perimeters of the bearing disk plates B and C to permit adjustment from time to time between the bearing plates and the antifriction elements 16, to keep the bearing plates in effective running condition. This adjustment is easily accessible and made at any time by the operator of the vehicle while in service on the road or in the usual service station.

The segments 22 and 23 of the clasp D are shown in cross section formed with two inwardly diverging annular arm members 28 and 29 (Fig. 3), which form the V-shaped groove facing inwardly and corresponding with the reversed peripheral converging beveled surfaces of the bearing plates B and C. The segments of the adjusting clasp D are also formed with the peripheral annular extensions 30 (Fig. 3), which slant and bear radially upwardly against or terminate closely to the surface of the apron plate A, thus serving to protect the bearing members B and C from wet, dust, sand and dirt and also to preserve the antifriction bearing members and lubrication that may be used for the bearing contact surfaces. The inner portion of the upper apron plate A is also provided with a depending skirt 31 for the same purpose. The clasp D is free to revolve or remain stationary with either or both plates B and C, through frictional engagement therewith.

My improvement is subject to modification within the spirit of the invention, Figs. 5 and 6 showing two changes in construction. In Fig. 5 concentric series of antifriction ball bearings 35 and 36 are provided between the peripheral bevel draw surfaces of the bearing plates B and C and the corresponding inwardly diverging surfaces of the contractible segments of the clasp D. These antifriction bearings permit easier adjustment between the bearing plates B and C, while providing accessibility for adjusting by my improvement. In Fig. 6 the bearing plates B and C are shown of skeleton form in cross section to save material without unduly sacrificing strength, the main features of the invention remaining substantially the same as shown in the preferred form as set forth in the foregoing description.

In Figs. 7 and 8 a modification of my invention is illustrated, whereby the coupling pin E can be removed and replaced from a position below the apron plate A, in the event of wear or defect. Ordinarily the apron plate A has been inaccessible below the front end of the trailer vehicle in such manner that the coupling pin can not be replaced without removing the apron plate which is laborious and costly. I overcome this objection by mounting the coupling pin E with its head 40 removably fastened centrally on the lower member 41 of my improved antifriction bearing couple F by the bolts 42 or other suitable means. The lower disk member 41 of the bearing couple has a centrally disposed opening 43 through which the shank 44 of the coupling pin is inserted downwardly and the upper disk member 45 has a centrally disposed opening 46, which is of sufficient diameter to freely admit the head 40. The upper bearing plate is permanently secured to the apron plate A by welding such as at 47, or other suitable means. The disk members 41 and 45 of the antifriction bearing contain the antifriction bearing elements 48 and have the adjusting clasp 49, similar to D above described without the shield 30. In this manner the coupling pin can be easily removed by disconnecting the adjusting sections of the clasp and removing disk plate 41. This means of detaching the coupling pin from below instead of from above the apron permits replacement of the coupling pin without having to dismantle the fifth wheel structure, which saves time and expense and is a distinct advantage.

In Fig. 9 the pivot pin E (Fig. 7) of the coupling is substituted by the centrally disposed annular depending sleeve 50 which is an integral part of the upper antifriction bearing disk 51 of the bearing disk couple, said sleeve being freely revoluble relative to the lower antifriction disk member 52 and the disk members having suitable antifriction members such as 53 freely disposed between them. This type of coupling pin simplifies the fifth wheel structure.

In Fig. 10 the clasp D shown and described above is modified in construction by providing the abutment 54 on the ends of the clasp segments with a double bolt instead of a single bolt connection, which enables the abutments to be confined within less diametral space. In this modification the abutment 54 of each companion pair is formed with a pair of bosses 55 and the corresponding bosses are joined by a pair of adjusting screws 56.

It is also contemplated that roller bearings may be substituted for the ball bearings above shown and described, such substitution coming within the scope of ordinary mechanical skill.

Further modifications are contemplated within the spirit of the invention and within the scope of the following claims.

I claim:

1. A fifth wheel structure for a vehicle couple, comprising two cooperating revoluble antifriction bearing disk members having a common axis, and adapted to be interposed between the members of the vehicle couple, said disk members having antifriction bearing means and being movably disposed to and from each other to equalize antifriction bearing contact therebetween, and said disk members having peripheral beveled surfaces converging radially, and contractible means engaging and holding said disk members clasped in adjusted relation to said bearing means so as to equalize bearing contact between the disk members and said bearing means.

2. In a fifth wheel structure for a vehicle couple having a pair of cooperating bearing disk members freely revoluble about the axis of the vehicle couple, said members having antifriction means therebetween and being movably disposed to and from each other to vary contact between the disk members and said antifriction means, a clasp embracing a portion of said disk members, said disk members and said clasp having draw surfaces therebetween by which the bearing contact between said disk members and said antifriction means is adjusted by contracting or expanding said clasp, and readily accessible means for regulating the expansion and contraction of said clasp.

3. In a fifth wheel structure for a vehicle couple, cooperating circular bearing plate members revoluble about the axis of the vehicle couple, antifriction bearing means interposed and freely revoluble between said plate members, a contractible clasp embracing and holding said plate members, said plate members and said clasp having draw surface engaging means therebetween, and means for regulating the contraction of said clasp by which said draw surface means is caused to adjust and equalize the bearing contact between the bearing plates and said antifriction bearing means.

4. In a fifth wheel structure for a vehicle couple, cooperating superimposed disk bearing plates revoluble about a common axis of the vehicle couple and having converging draw surface perimeters, antifriction bearing means interposed and freely revoluble between said bearing plates, a contractible clasp encircling and engaging the draw surface perimeters of said bearing plates and having inner diverging beveled surfaces corresponding with the converging draw surfaces on said plates, and readily accessible means for regulating the contraction of said clasp whereby contact between the draw surfaces of said plates and said clasp is varied to equalize bearing contact.

5. A fifth wheel structure for a vehicle couple, comprising a pair of bearing disks freely revoluble about a common axis with the vehicle couple connection, and having radially converging draw surface perimeters, freely revoluble antifriction elements between said bearing disks, said disks being freely movable axially to regulate any slack between their inner faces and said antifriction elements, a contractible clasp having inner circumferential diverging annular draw surfaces engaging the perimeters of said disks, and readily accessible means for contracting or releasing said clasp to regulate the bearing contact between said disks and antifriction elements.

6. In a fifth wheel structure, a pair of cooperating circular bearing members freely revoluble about a common axis having antifriction elements interposed and freely revoluble therebetween and provided with converging perimeters, said bearing members being movably disposed to and from each other to regulate any slack between said bearing members and said antifriction elements, a clasp having contractible segments provided with inwardly diverging circumferential sides embracing the converging perimeters on said bearing members and adapted when said segments are expanded to equalize slack between said bearing members and said antifriction elements, and means for adjustably securing the adjacent ends of said clasp segments together to regulate the diameter of the clasp and the bearing contact between the bearing members and the antifriction elements.

7. In a fifth wheel structure, an apron plate, a pair of coaxially superimposed bearing disk plates having readily converging perimeters and antifriction bearing elements freely rotatable between their inwardly facing sides, said upper disk plate being rigidly secured to the lower side of said apron plate, a contractible segmental clasp having inwardly diverging circumferential draw surfaces embracing said converging perimeters, means for adjustably and separably securing the corresponding ends of said segments together and adapted to regulate the said disk plates in relation to said antifriction bearing elements, and said lower disk plate having a depending coupling pin detachably supported thereby.

8. In a fifth wheel structure an apron plate, a pair of coaxially superimposed bearing disk plates having radially converging perimeters and antifriction bearing elements freely rotatable between their inwardly facing sides, said upper disk plate being rigidly secured to the lower side of said apron plate, a contractible segmental clasp having inwardly diverging circumferential draw surfaces embracing said converging perimeters, means for adjustably and separably securing the corresponding ends of said segments together and adapted thereby to regulate the said disk plates relative to said antifriction bearing elements, and a coupling pin coaxially disposed in relation to said disk plates having its head end detachably secured to and its shank depending from said lower disk plate.

TOBIAS WEBER.

REFERENCES CITED

The following references are of record in the file of this patent:

UNITED STATES PATENTS

| Number | Name | Date |
| --- | --- | --- |
| 744,742 | Gander | Nov. 24, 1903 |
| 1,130,538 | Rader | Mar. 2, 1915 |